(12) United States Patent
Haaber (10) Patent No.: US 12,496,473 B2
(45) Date of Patent: Dec. 16, 2025

(54) SYSTEMS AND METHODS FOR PRODUCING USER-CUSTOMIZED FACIAL MASKS AND PORTIONS THEREOF

(71) Applicant: THEMAGIC5 INC., Charlotte, NC (US)

(72) Inventor: Bo Haaber, Charlotte, NC (US)

(73) Assignee: THEMAGIC5 INC.

(*) Notice: Subject to any disclaimer, the term of this patent is extended or adjusted under 35 U.S.C. 154(b) by 506 days.

(21) Appl. No.: 17/996,134

(22) PCT Filed: Apr. 12, 2021

(86) PCT No.: PCT/US2021/026863
§ 371 (c)(1),
(2) Date: Oct. 13, 2022

(87) PCT Pub. No.: WO2021/211444
PCT Pub. Date: Oct. 21, 2021

(65) Prior Publication Data
US 2023/0139237 A1    May 4, 2023

Related U.S. Application Data

(60) Provisional application No. 63/009,288, filed on Apr. 13, 2020.

(51) Int. Cl.
*A62B 18/02* (2006.01)
*A41D 13/11* (2006.01)
*G06F 30/10* (2020.01)

(52) U.S. Cl.
CPC ........ *A62B 18/025* (2013.01); *A41D 13/1107* (2013.01); *G06F 30/10* (2020.01)

(58) Field of Classification Search
CPC ....... A62B 18/025; A62B 18/08; A62B 18/02; A62B 18/00; A41D 13/1107; G06F 30/10; A61M 2016/0661; A61M 2207/00
See application file for complete search history.

(56) References Cited

U.S. PATENT DOCUMENTS

| | | |
|---|---|---|
| 5,727,259 A | 3/1998 | Kawamata |
| 6,349,417 B1 | 2/2002 | Chiang |

(Continued)

FOREIGN PATENT DOCUMENTS

| | | | | |
|---|---|---|---|---|
| CN | 105930880 A | * | 9/2016 | |
| CN | 108472467 A | * | 8/2018 | ........... A61B 5/0064 |

(Continued)

OTHER PUBLICATIONS

Office Action in connection to U.S. Appl. No. 18/510,057, dated Jun. 24, 2024.

(Continued)

*Primary Examiner* — Tarla R Patel
(74) *Attorney, Agent, or Firm* — Meunier Carlin & Curfman LLC.

(57) ABSTRACT

Various implementations include methods of identifying data for producing a user-customized mask, systems for producing the same, a user customized mask, and an elongated support. To produce the mask or elongated support, 3D-data is received that defines the contour and dimensions of at least a portion of user's face. The 3D-data is determined by analyzing vector data associated with an area around the nose and mouth of the user, for example. A contact area(s) and a face contacting surface within the contact area are identified on the portion of the face of the user based on the 3D-data. And, structure-data based on the 3D-data and the identified contact area is provided for designing and producing a mask contacting surface. The mask contacting surface causes a portion of the mask to match the contour of the face contacting surface of the user.

20 Claims, 5 Drawing Sheets

(56) References Cited

U.S. PATENT DOCUMENTS

| | | | |
|---|---|---|---|
| 6,349,420 B1 | 2/2002 | Chiang | |
| 6,405,384 B1 | 6/2002 | Chiang | |
| D867,438 S | 11/2019 | Haaber | |
| 2006/0023228 A1* | 2/2006 | Geng | A61B 5/411 356/601 |
| 2006/0219246 A1 | 10/2006 | Dennis | |
| 2008/0263753 A1 | 10/2008 | Chiang | |
| 2010/0313339 A1 | 12/2010 | Chou | |
| 2012/0255104 A1 | 10/2012 | Didier | |
| 2013/0174333 A1 | 7/2013 | Schwartz | |
| 2014/0043329 A1* | 2/2014 | Wang | G06T 17/20 345/420 |
| 2014/0189944 A1 | 7/2014 | Lynd | |
| 2015/0055085 A1* | 2/2015 | Fonte | G02C 7/024 700/98 |
| 2015/0083137 A1* | 3/2015 | Mittelstadt | A61M 16/0616 128/206.24 |
| 2015/0157822 A1 | 6/2015 | Karpas et al. | |
| 2015/0212343 A1 | 7/2015 | Fonte | |
| 2015/0273170 A1* | 10/2015 | Bachelder | A61M 16/0611 264/129 |
| 2015/0351964 A1 | 12/2015 | Schwartz | |
| 2016/0103335 A1 | 4/2016 | Ben-Shahar | |
| 2018/0296783 A1* | 10/2018 | Davis | A61M 16/0616 |
| 2019/0369418 A1 | 12/2019 | Joy et al. | |
| 2021/0322702 A1* | 10/2021 | Davis | B33Y 80/00 |

FOREIGN PATENT DOCUMENTS

| | | | |
|---|---|---|---|
| DE | 201 13 478 U1 | 2/2002 | |
| EP | 1 857 150 A2 | 11/2007 | |
| FR | 2 937 558 A1 | 4/2010 | |
| JP | 7309562 B2 * | 7/2023 | ............ A41D 13/11 |
| WO | WO-2012126135 A1 * | 9/2012 | ......... G06K 9/00201 |
| WO | WO-2014075797 A1 * | 5/2014 | .......... A61M 11/065 |
| WO | WO-2014151324 A1 * | 9/2014 | ............ A61M 16/06 |
| WO | 2016/176630 A1 | 11/2016 | |
| WO | WO-2017109630 A1 * | 6/2017 | .......... A61B 5/0064 |
| WO | WO-2018087386 A1 * | 5/2018 | ............... A61F 9/02 |
| WO | WO-2021080924 A1 * | 4/2021 | ............ A62B 18/02 |

OTHER PUBLICATIONS

International search report and written opinion in PCT/US2021/026863. Mailed Jul. 27, 2021. 12 pages.

PCT/EP2017/079178, International Search Report and Written Opinion issued on Mar. 8, 2018.

Office Action issued in connection to European Application No. 17807747.5, dated Oct. 28, 2022.

Office Action issued for U.S. Appl. No. 16/349,069, dated Jul. 6, 2023.

Office Action issued for U.S. Appl. No. 16/349,069, dated Sep. 8, 2022.

Final Office Action relating to U.S. Appl. No. 16/349,069, dated Mar. 24, 2023.

Custom Fitted Goggles, posted at swimswam.com, posting date Oct. 6, 2017, [online], [site visited Nov. 4. 2022]. Available from Internet , URL: https://swimswam.com/the-worlds-first-custom-fitted-goggles-kickstarter/ (Year: 2017).

* cited by examiner

SYSTEMS AND METHODS FOR PRODUCING USER-CUSTOMIZED FACIAL MASKS AND PORTIONS THEREOF

BACKGROUND

Many people have at one time worn a face masks as a shield for protecting the mouth and nose from dust, virus, etc. The required degree of close-fit between the mask and the face of the user depends on the intended use, however in all cases it may be difficult to find an acceptable combination of a sufficiently close-fitting and comfortable masks, as inter alia the contour and size of the human face and the location of the nose and mouth relative to each other varies from person to person.

If the mask is not sufficiently comfortable, the result may be that the lack of comfort or irritation experienced by the user causes the user to omit the use of the masks, which allows bacteria, dust, or contaminants to get into the person. Often the lack of comfort or irritation is because the masks do not fit the contour of the face around the mouth and nose.

Thus, known masks do not provide a combination of a sufficiently close-fitting and comfortable masks.

BRIEF SUMMARY

Various implementations include a method of identifying data for producing a user-customized mask for contacting at least a face contacting surface of a user when the user wears the user-customized mask. The method includes (1) receiving 3D-data defining the contour of at least a portion of the face of the user and defining the dimensions of the portion of the face, wherein at least a portion of the 3D-data is determined by analyzing vector data associated with an area that at least includes an area around the nose and mouth of the user, (2) identifying at least one contact area on the portion of the face of the user based on the 3D-data, wherein the face contacting surface is within the at least one contact area, and (3) providing structure-data based on the 3D-data and the identified at least one contact area for designing and producing at least a portion of the user-customized mask adapted to cause the portion of the mask to match the contour of the face contacting surface of the user.

In some implementations, the method further comprises designing and producing an elongated support using the structure-data, the elongated support for coupling to at least a portion of the user-customized mask and being adapted to cause the portion of the mask to match the contour of the face contacting surface of the user.

In some implementations, receiving 3D-data further comprises receiving a plurality of 2D-images of the portion of the face of the user, wherein the 2D-images define the dimensions of the portion of the face of the user at least in the area around the nose and mouth of the user, and producing the 3D-data based on the plurality of 2D-images by analyzing vector data at least in an area around the nose and mouth of the user.

Various other implementations include a system for producing a user-customized mask for contacting at least a face contacting surface of a user when the user wears said mask. The system includes (1) a processor that (1) receives and analyzes 3D-data defining the contour of at least a portion of the face of the user and defining the dimensions of the portion of the face of the user, wherein at least a portion of said 3D-data is determined by analyzing vector data associated with an area that at least includes an area around the nose and mouth of the user, (2) identifies at least one contact area on the portion of the face of the user based on the 3D-data, and (3) provides structure-data based on the 3D-data and the identified at least one contact area for designing and producing at least a portion of the user-customized mask adapted to cause the portion of the mask to match the contour of the face contacting surface of the user; and (2) a production device that receives the structure-data and produces the portion of the mask based on the structure-data.

In some implementations, the system produces an elongated support that is able to be coupled to the portion of the mask and causes the portion of the mask to match the contour of the face contacting surface.

Various other implementations include a user-customized mask for contacting at least a face contacting surface of a user when the user wears the mask. A portion of the user-customized mask comprises a mask contacting surface for contacting the face contacting surface of the user, wherein the mask contacting surface matches a contour and dimensions of the face contacting surface, and a contour of the mask contacting surface is determined by analyzing vector data associated with an area that at least includes an area around the nose and mouth of the user or one or more other users.

In some implementations, the user-customized mask is a personal protective equipment.

In some implementations, the user-customized mask comprises a mask body and an elongated support, the elongated support being coupled to the mask body, wherein the elongated support causes a portion of the mask to which the elongated support is coupled to fit against the face contacting surface.

In some implementations, the elongated support is coupled to the body of the mask along an edge of the mask.

In some implementations, the body of the mask defines a sleeve, and the elongated support is received within the sleeve to couple the elongated support with the body of the mask.

In some implementations, the elongated support is coupled to the body of the mask by adhesive.

In some implementations, the elongated support is coupled to the body of the mask by hook or loop material engaged with the other of loop or hook material on the body of the mask.

Various other implementations include an elongated support for coupling with a user-customized mask. The user-customized mask is for contacting at least a face contacting surface of a user when the user wears the mask. The elongated support includes a first surface having a contour that matches a contour and dimensions of the face contacting surface of the user, and a second surface that is opposite and spaced apart from the first surface.

In some implementations, a thickness of the elongated support is constant along a length of the elongated support.

In some implementations, the contour of the first surface is determined by analyzing vector data associated with an area that at least includes an area around the nose and mouth of the user or one or more other users.

BRIEF DESCRIPTION OF THE DRAWINGS

The structure of the user-customized mask and the method of producing the user-customized mask are described in more detail below with references to example embodiments shown in the drawings wherein.

DETAILED DESCRIPTION

Within the present application, the mask may be understood as an element, which is adapted to encircle at least the mouth and the nose of the user. The mask may shield or completely seal the mouth and nose from environmental surroundings depending on the type and use of mask and may as such be used for healthcare workers, construction workers, landscape workers, people working with power tools or welding, laboratory work, or any person that needs to shield and/or protect his or her respiratory system from the environment.

Within the present application, a face contacting surface may be understood as at least one area or at least one line on the face of the user, which at least partially surrounds/encircles the nose and/or mouth of the user. For example, the face contacting surface may be one area or line that surrounds/encircles the nose and/or mouth. In another example, the face contacting surface may include a line that extends over and outwardly from an upper portion of the user's nose, stopping short of encircling the user's mouth. In another example, the face contacting surface may be two areas or lines that surround/encircle the user's nose and mouth, respectively. The location and dimensions of the face contacting surface may be predefined. However, in other implementations, the location of the face contacting surface on the face of the user may be determined depending on the contour of the face of the user and/or on face contact area(s) defined by the user. Furthermore, the face contacting surface may also include the area of the ears to make the protective equipment cover and protect the ears, attach to, and/or be supported by the ears.

In addition, although the systems and methods described herein identify data for producing a user-customized mask and/or produce the user-customized mask, the systems and methods described herein may be used to identify data for producing any device that is intended to have a user-customized fit with an external surface of the user's body and/or produce the user-customized device. For example, systems and methods for producing a user-customized device receive three-dimensional (3D) data defining a contour of a portion of the external surface of the user's body and the dimensions of the portion of the external surface, wherein at least a portion of the 3D data is determined by analyzing vector data associated with an area around the portion of the external surface of the user's body, identify at least one contact area for the external surface of the portion of the user's body based on the 3D data, and provide structure-data based on the 3-D data and the identified at least one contact area for designing and fabricating a device having a device contacting surface that is intended to be worn against or adjacent to (e.g., with a material in between the device and the external surface of the body) a portion of the external surface of the body within the identified at least one contact area. For example, the portion of the external surface of the user's body may include the user's feet, hands, arms, and legs.

Providing user-customized masks is advantageous, as it ensures that at least a portion of the mask fits perfectly (has an optimal position) on the face of the user. Furthermore, the risk of the user having to wear uncomfortable masks that may hurt or that leaks is minimized.

By providing user-customized masks based on 3D-data defining the contour and dimensions of at least a portion of the face of the user, the masks are designed based on the real contour of the portion of the face of the user. The masks are not designed based on an estimate of how the contour of a face would generally look combined with a flexible membrane to compensate for not-similar areas between the face of the user and the masks.

By providing structure-data based on the 3D-data and the identified contact area(s), where the structure-data is used for designing at least a portion of the part of said mask that is adapted to contact the face contacting surface of the user, the contour of that portion of said part of said mask is therefore designed to follow the contour of the face contacting surface on the face of the user, around at least a portion of the nose and mouth of the user.

Figure 1A:
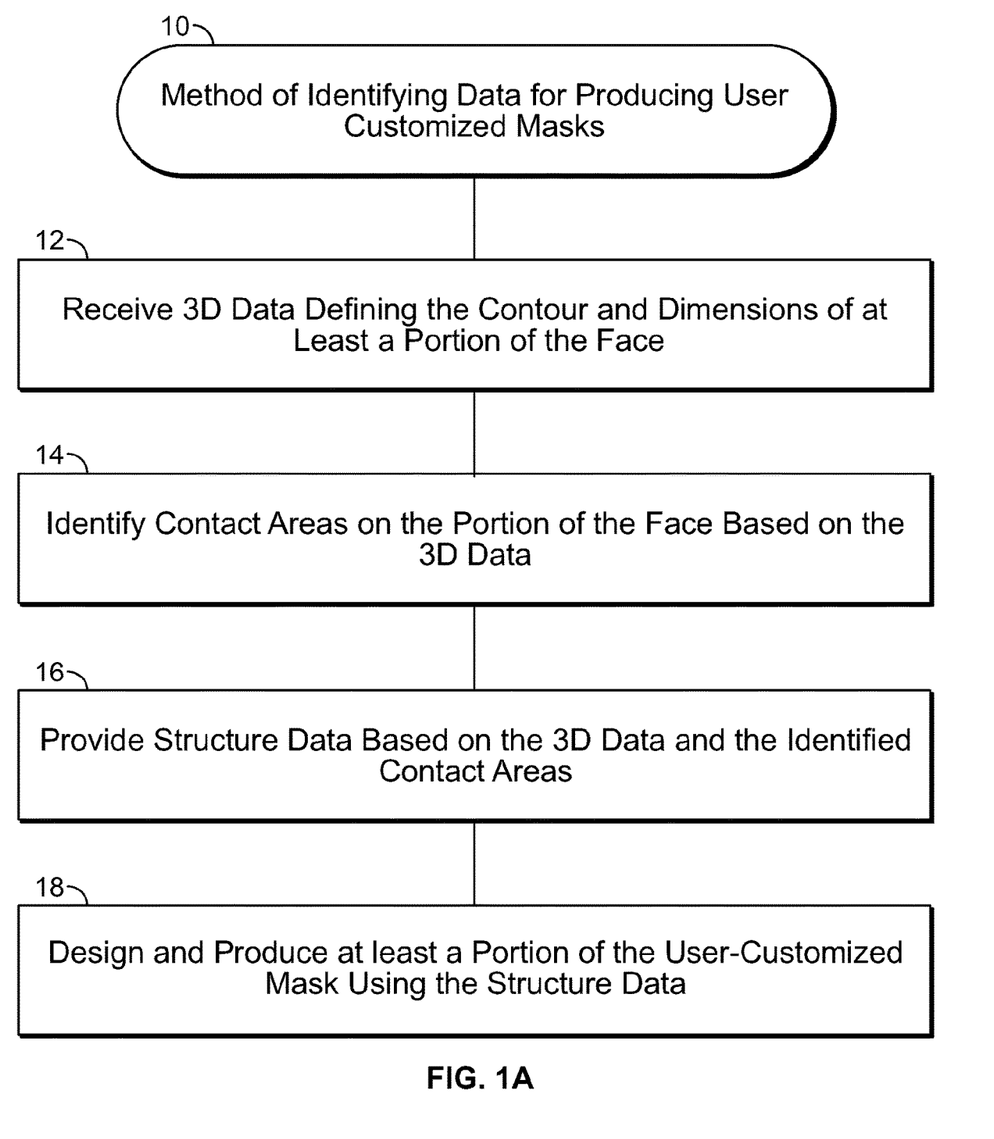
FIG. 1A shows a method of producing of a user-customized mask according to one implementation.

FIG. 1A illustrates a method 10 of identifying data for producing a user-customized mask for contacting at least a face contacting surface of a user when the user wears the user-customized mask, according to one implementation. In step 12, 3D-data defining the contour and dimensions of at least a portion of the face of the user are received, wherein at least a portion of the 3D-data is determined by analyzing vector data associated with an area that at least includes an area around the nose and mouth of the user. Then, in step 14, a contact area(s) 104 on the portion of the face of the user are identified based on the 3D-data. The face contacting surface 103 is within the contact area 104. And, in step 16, structure-data based on the 3D-data and the identified contact area is provided for designing and producing at least a portion of the user-customized face mask. In one aspect, the portion of the user-customized face mask comprises an elongated support. The elongated support is for coupling to at least a portion of the user-customized mask and is adapted to cause the portion of the mask to match the contour of the face contacting surface of the user. In step 18, the portion of the user-customized face mask is designed and produced using the structure-data.

In some instances, receiving 3D-data in step 12 further comprises receiving a plurality of 2D-images of the portion of the face of the user, wherein the 2D-images define the dimensions of the portion of the face of the user at least in the area around the nose and mouth of the user, and producing the 3D-data based on the plurality of 2D-images by analyzing vector data at least in an area around the eyes, nose, and/or mouth of the user.

Figure 1B:
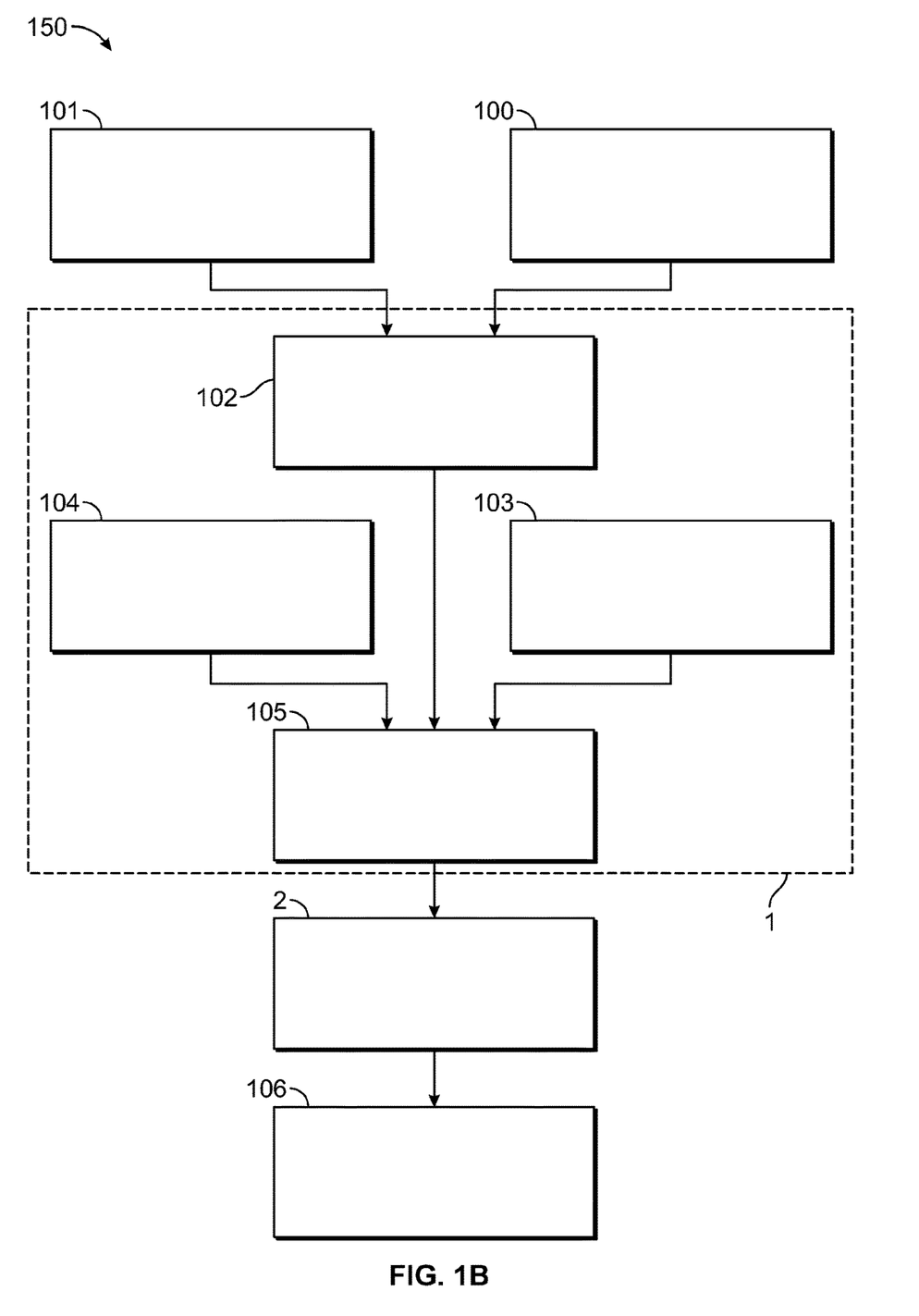
FIG. 1B shows a schematic diagram of a system of producing a user-customized mask, according to one implementation.

FIG. 1B illustrates a system 150 for producing a user-customized mask. The system 100 includes a processor 160 and a production device 120. The processor 160 performs the steps of the method 10 shown in FIG. 1A and described above. As shown, the 3D-data received by the processor 160 includes a plurality of 2D-images 100 of the portion of the face of the user. The 2D-images 100 may define the dimensions 101 of the portion of the face of the user at least in the area around the nose and mouth of the user, or the dimensions 101 may be input and/or acquired separately.

The processor 160 produces the 3D-data 102 based on the plurality of 2D-images 100 by analyzing vector data at least in an area around the eyes, nose, and/or mouth of the user. For example, the 3D data 102 defines the contour and dimensions of at least a portion of the face of the user. The portion of the face of the user includes at least an area just above the nose of the user, for example. In another example, the portion of the face may include an area around the eyes, nose, and mouth of the user. And, in another example, the portion of the face may include at least a portion of an area intended for being in contact with the mask when the user wears the mask. The area intended for being in contact with the mask may vary depending on the type of mask.

The 2D-images 100 and/or the 3D-data 102 may be produced/detected by the user, according to some implementations. For example, 2D images 100 or 3D data 102 may be acquired using the camera of the user's smartphone. And, the production, collection, and/or transmittal of the 2D images 100 or 3D data 102 may be sent to the processor 160 by use of a specially developed application program ("app") installed on the user's smartphone or tablet, for example. In some instances, the processor 160 may be the processor of the smartphone or tablet, or it may be a processor separate from the smartphone or tablet where the data 102 is transferred from the smartphone or tablet to the separate processor.

In alternative implementations, the 3D-data 102 defining the contour and dimensions of at least a portion of the user's face at least in the area around the eyes, nose, and/or mouth may be provided to the processor 160 directly. For example, the 3D data 102 may include a 3D image and the 3D-data or image may be detected by a 3D camera or stereo camera using vector analysis.

The processor 160 also identifies the contact area 104 on the user's face based on the 3D data 102. Within the identified contact area 104 is a face contacting surface 103, which is the surface on the face of the user intended to contact the mask when the user is wearing the mask. Data regarding the face contacting surface 103 may be defined automatically by the processor 160 based on a pre-defined contact area(s) 104. Alternatively, the processor 160 may receive information regarding contact area(s) 104 on the face of the user that include the face contacting surface 103, and the processor 160 may model the location of the face contacting surface 103 based on this information.

The contact area(s) 104 include facial points and is identified by analyzing vector data. Each vector includes a starting position, a length, and an angle. The analysis is based on a predefined number of vectors positioned in the mask, and the vectors are analyzed together. A position is identified as optimal when it gives an optimal combination of these pre-defined vectors. For example, the vectors are analyzed in a square pattern that has a perimeter of 10 mm, and the increments are taken every 0.5 mm. In particular, in one example, the vector data may include a starting point that is midway between the inner corners of the user's eyes as the starting point. The vector data is then taken at points spaced apart from this starting point, such as laterally and/or inferiorly relative to each side of the starting point. For example, the vector data is taken at points spaced apart every 2-5 mm and following the square pattern in the lateral/medial directions and the inferior/superior directions. The horizontal location of the mask may be determined, or calculated, from vector data at points starting from the middle of the nose and moving laterally. The vertical location of the mask may be determined from vector data at points starting from the middle of the nose and moving inferiorly and superiorly along the nose. When the vectors reach an inter-dependent optimal angle and distance relative to the face of the user and to other vectors, a portion of the contact area 104 and face contacting surface 103 is identified. The predefined angle is an angle when the vector is pointing away from the face. This technique of determining the contact area 104 may be used at several locations around the face so that an optimal contacting surface may be determined and an optimal mask for the user is produced. For example, vector data may be taken in areas around the user's, nose, mouth, ears, and/or cheeks to determine the optimal face contacting surface 103.

In other implementations, the distance between the data points may be larger or smaller, and the pattern followed may be another shape, such as an ellipsis, circle, rectangle, triangle, etc. The vector data defines the structure change (contour) of the face.

The face contacting surface 103 may also be determined based on only one contact area 104 and a face contacting surface 103 of a predefined shape. For example, the contact area 104 may be determined from vectors at points starting from the middle nose and moving laterally and/or inferiorly and superiorly along the nose. When the vectors reach a predefined angle relative to the face of the user, a face contacting surface 103 on which part of the mask is to touch the face of the user is located.

The optimal face contacting surface 103 may be arranged in the vicinity of the edges of the skull of the user that define the area around the nose and mouth. Thus, if the position of the face contacting surface 103 is altered only slightly (e.g. 2 mm), the mask contacting surface of the mask may be misaligned with the optimal position, which may allow dust or contaminants to enter the mask.

Based on the 3D-data 102 and the identified contact area(s) 104, the processor 160 generates (models) structure-data 105, which can be used for designing a mask contacting surface of a mask 106. The mask contacting surface is the portion of the mask 106 that is intended to contact the face contacting surface 103 of the user when the mask 106 is worn. The structure data 105 reproduces the contour and dimension of the face contacting surface 103 of the user's face such that the mask contacting surface matches the contour and dimensions of the face contacting surface 103.

The processor 160 provides the structure-data 105 to a production device 120 that receives the structure-data 105. The production device 120 uses the structure data 105 to produce at least the mask contacting surface of the mask 106. The production device 120 may also produce the entire mask (e.g. the mask contacting structure and/or a mask body or frame) so that there is no need for assembling the mask body or frame and the mask contacting part after production. In one implementation, at least a portion of the mask body is formed (e.g., integrally) with the mask contacting surface.

Figure 2:
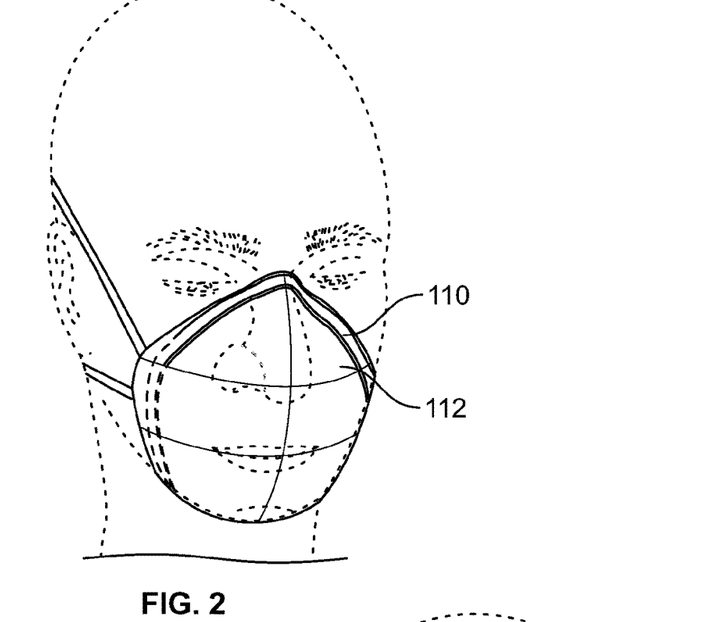
FIG. 2 shows a perspective view of a user-customized mask being worn according to one implementation.
Figure 3:
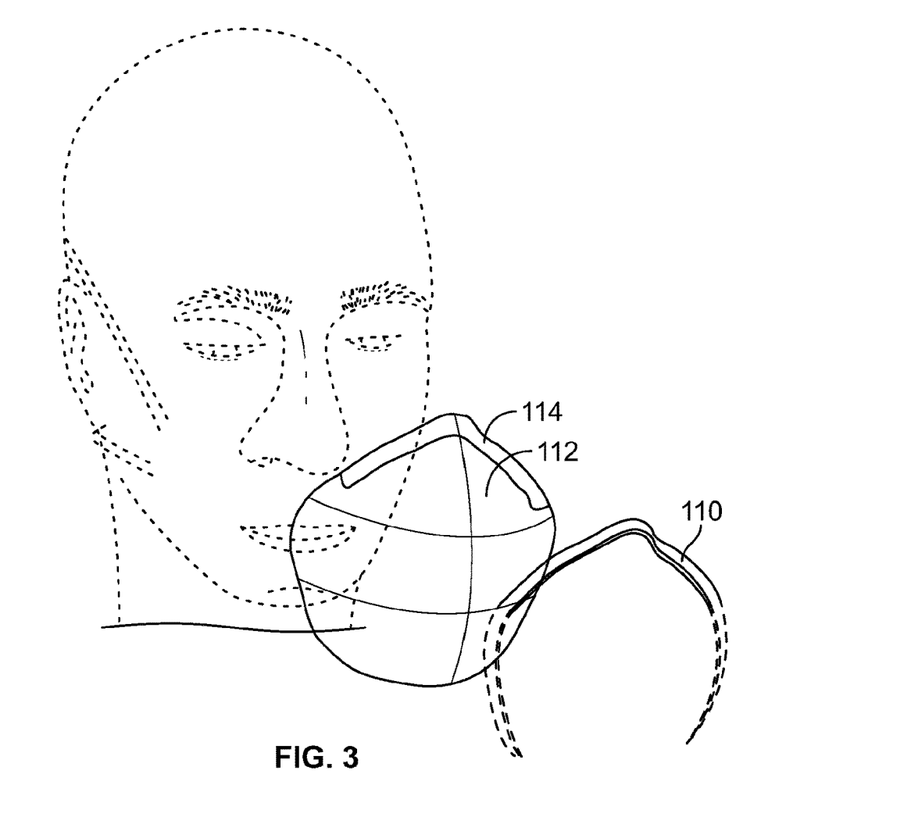
FIG. 3 shows an exploded view of the user-customized mask shown in FIG. 2.
Figure 4:
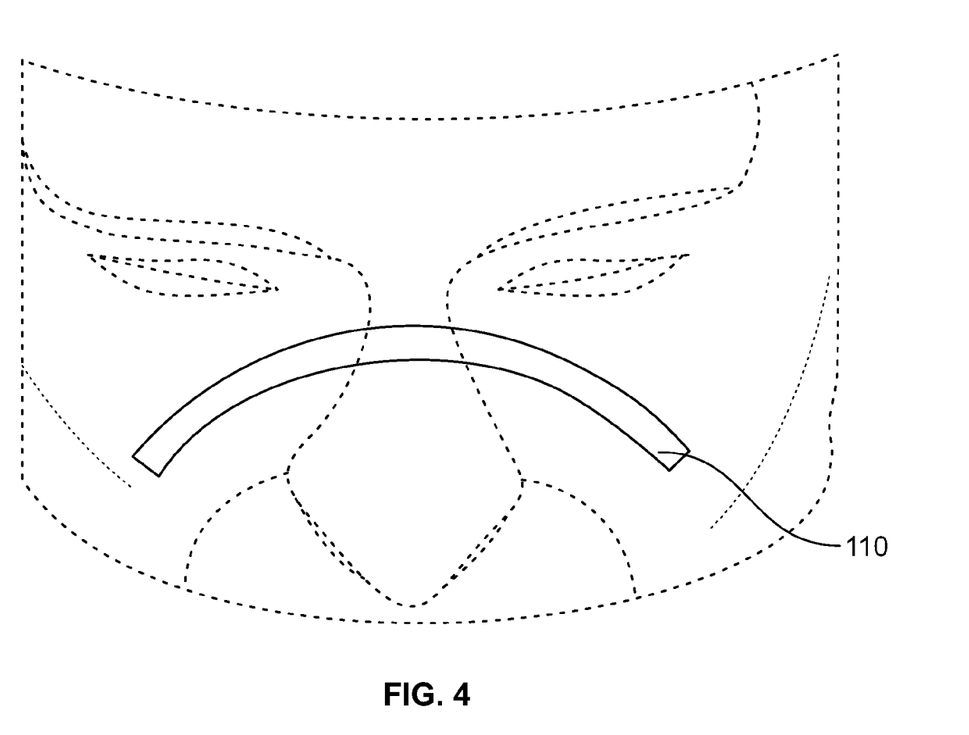
FIG. 4 shows a frontal view of an elongated support of the mask shown in FIG. 2 relative to the user's face.

In the implementations shown in FIGS. 2-4, the production device 120 produces an elongated support 110 that is made separately from the mask body 112. The mask body 112 may include a standard mask body or a customized mask body. For example, the mask body may include a breathing valve, a carbon filter, and/or a cool flow valve. In addition, the mask may conform to N95 (American standard managed by NIOSH—part of the Center for Disease Control—CDC), KN95 (a Chinese standard), FFP2 or FFP3 (parts of the BS—EN149:2001 standard), or may be produced and approved by one or more of these standards. The mask may block at least 95 percent of very small (0.3 micron) test particles.

The elongated support 110 may be hard, soft, flexible, rigid. For example, elongated support 110 may be made of suitable materials, such as any suitable 3D printing material, such as polylactic acid (PLA), rubber, silicone, or polycarbonate (PC). The elongated support 110 has a first surface that includes the mask contacting surface and a second surface that is opposite and spaced apart from the first surface. The first surface faces the user's face, and the second surface faces in the opposite direction. A thickness of the elongated support 110 (distance between the first surface and the second surface) may be constant along a length of the elongated support 110.

The mask body 112 shown in FIGS. 2 and 3 is a standard mask body. A superior edge of the mask body 112 defines a sleeve 114 into which the elongated support 110 shown in FIGS. 2-4 is received and securely maintained. If the standard mask body 112 does not include the sleeve 114, the sleeve 114 may be made separately and coupled to the superior edge of the mask 112. For example, the sleeve 114 may be made from a fabric material (e.g., the same material as the mask body 112 or another fabric material that feels comfortable to the user) and may be coupled to the mask body 112 by sewing, adhesive, hook and loop, or other suitable fastener.

When the elongated support 110 is disposed within the sleeve 114, the elongated support 110 urges the material of the mask body 112 between the elongated support 110 and the user's face to fit against the contour of the user's face. The elongated support 110 shown in FIGS. 2-4 extends over the user's nose and along the user's cheek bones, but it does not extend around the entire perimeter of the mask body 112. However, in other implementations, the elongated support may be produced to extend further or completely around the perimeter of the mask body. In addition, the elongated support may be coupled to the mask body using adhesive, hook and loop material, or other type of suitable fastener.

In some implementations, the production device 120 may be a 3-D printer, such as a commercially available 3-D printer. In other implementations, the production device 120 may include grinding or cutting machines (e.g., computer controlled or manual) that grinds or cuts material from a block of material to form the mask contacting surface. The block may be separate from the mask or formed as a part of the part of the mask. If formed as a part of the mask, the block portion of the mask is oversized such that material can be removed to form the mask contacting surface to allow the mask contacting surface to fit against the user's face (e.g., with or without a softer material between the mask contacting surface and the user's face). A thickness of the block portion that is used to form the mask contacting surface is selected based on the intended spacing between the user's face contacting surface and the exterior surface of the mask 106.

Alternatively, the production device 120 produces a form using the structure data 105. The form, or die, is used for casting the mask contacting surface of the mask 106.

In other implementations, an app executed by a smart phone (e.g., the user's smart phone) may control the production, collection, and/or transmittal of the 2D-images 100 and/or the 3D-data 102 to the processor 160. And, the app may also carry out the vector analysis of the 3D-data 102 and/or provides the structure-data 105 to the production device 120. The structure-data 105 can be provided to the processor 160 or directly to the production device 120.

The systems described herein have been described above as comprised of units. One skilled in the art will appreciate that this is a functional description and that the respective functions can be performed by software, hardware, or a combination of software and hardware. A unit can be software, hardware, or a combination of software and hardware. The units can comprise software for producing structure data that can used to design and produce at least a portion of a user-customized face mask. In one exemplary aspect, the units can comprise a computing device that comprises a processor 521 as illustrated in FIG. 5 and described below.

Figure 5:
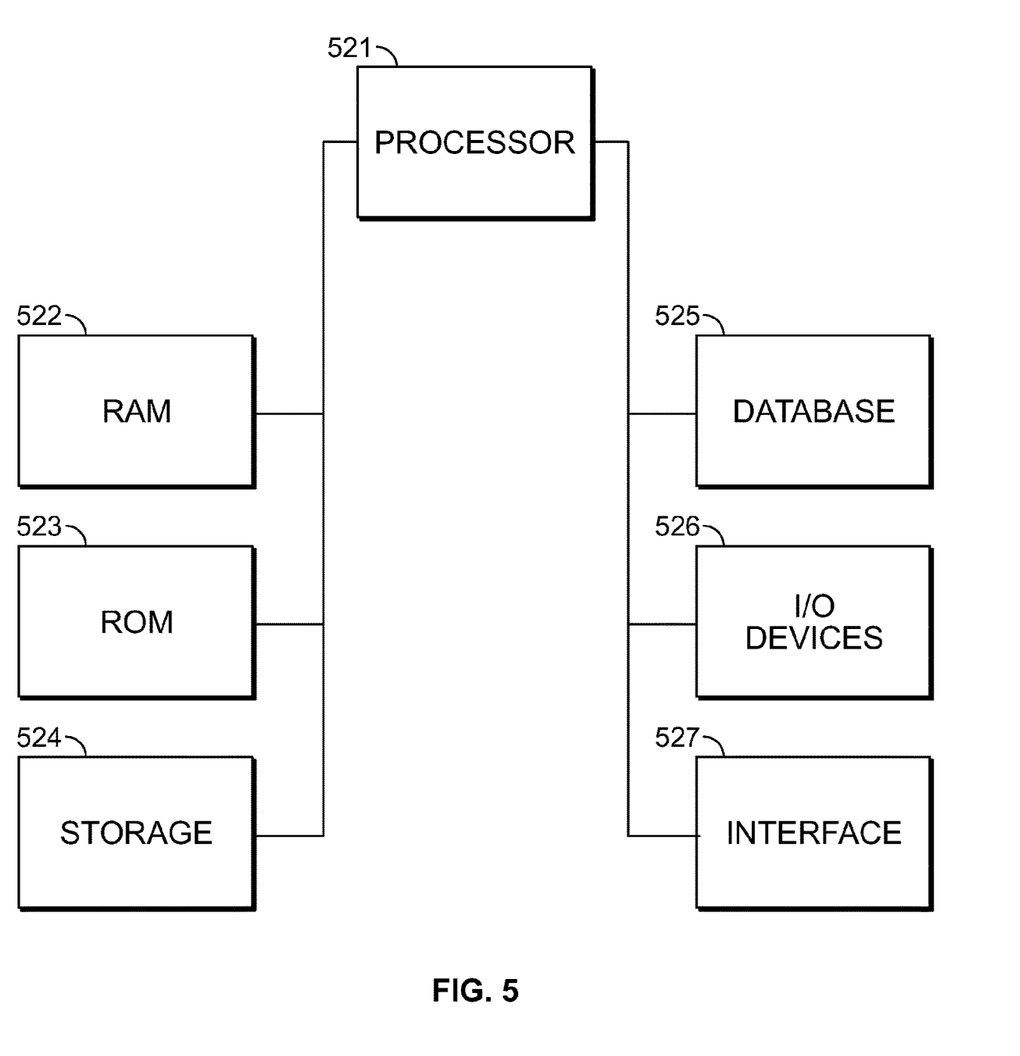
FIG. 5 illustrates an exemplary computing device (e.g., computer) that can be used for producing structure data that can be used to design and produce at least a portion of a user-customized face mask, according to one implementation.

FIG. 5 illustrates an exemplary computing device (e.g., computer) that can be used for producing structure data that can be used to design and produce at least a portion of a user-customized face mask. As used herein, "computer" may include a plurality of computers. The computers may include one or more hardware components such as, for example, a processor 521, a random access memory (RAM) module 522, a read-only memory (ROM) module 523, a storage 524, a database 525, one or more input/output (I/O) devices 526, and an interface 527. Alternatively and/or additionally, the computer may include one or more software components such as, for example, a computer-readable medium including computer executable instructions for performing a method associated with the exemplary embodiments. It is contemplated that one or more of the hardware components listed above may be implemented using software. For example, storage 524 may include a software partition associated with one or more other hardware components. It is understood that the components listed above are exemplary only and not intended to be limiting.

Processor 521 may include one or more processors, each configured to execute instructions and process data to perform one or more functions associated with producing structure data that can used to design and produce at least a portion of a user-customized face mask. Processor 521 may be communicatively coupled to RAM 522, ROM 523, storage 524, database 525, I/O devices 526, and interface 527. Processor 521 may be configured to execute sequences of computer program instructions to perform various processes. The computer program instructions may be loaded into RAM 522 for execution by processor 521.

RAM 522 and ROM 523 may each include one or more devices for storing information associated with operation of processor 521. For example, ROM 523 may include a memory device configured to access and store information associated with the computer, including information for identifying, initializing, and monitoring the operation of one or more components and subsystems. RAM 522 may include a memory device for storing data associated with one or more operations of processor 521. For example, ROM 523 may load instructions into RAM 522 for execution by processor 521.

Storage 524 may include any type of mass storage device configured to store information that processor 521 may need to perform processes consistent with the disclosed embodiments. For example, storage 524 may include one or more magnetic and/or optical disk devices, such as hard drives, CD-ROMs, DVD-ROMs, or any other type of mass media device.

Database 525 may include one or more software and/or hardware components that cooperate to store, organize, sort, filter, and/or arrange data used by the computer and/or processor 521. For example, database 525 may store vector data, 2D and 3D images, and the like, as well as computer-executable instructions for producing structure data that can used to design and produce at least a portion of a user-customized face mask. It is contemplated that database 525 may store additional and/or different information than that listed above.

I/O devices 526 may include one or more components configured to communicate information with a user associated with computer. For example, I/O devices may include a console with an integrated keyboard and mouse to allow a user to maintain a database of digital images, results of the analysis of the digital images, metrics, and the like. I/O devices 526 may also include a display including a graphical user interface (GUI) for outputting information on a monitor. I/O devices 526 may also include peripheral devices such as, for example, a printer for printing information associated with the computer, a user-accessible disk drive (e.g., a USB port, a floppy, CD-ROM, or DVD-ROM drive, etc.) to allow a user to input data stored on a portable media device, a microphone, a speaker system, a camera, or any other suitable type of interface device.

Interface 527 may include one or more components configured to transmit and receive data via a communication network, such as the Internet, a local area network, a workstation peer-to-peer network, a direct link network, a wireless network, or any other suitable communication platform. For example, interface 527 may include one or more modulators, demodulators, multiplexers, demultiplexers, network communication devices, wireless devices, antennas, modems, and any other type of device configured to enable data communication via a communication network.

Various implementations have been described. Nevertheless, it will be understood that various modifications may be made without departing from the spirit and scope of the description. Accordingly, other implementations are within the scope of the following claims.

Disclosed are materials, systems, devices, methods, compositions, and components that can be used for, can be used in conjunction with, can be used in preparation for, or are products of the disclosed methods, systems, and devices. These and other components are disclosed herein, and it is understood that when combinations, subsets, interactions, groups, etc. of these components are disclosed that while specific reference of each various individual and collective combinations and permutations of these components may not be explicitly disclosed, each is specifically contemplated and described herein. For example, if a device is disclosed and discussed every combination and permutation of the device, and the modifications that are possible are specifically contemplated unless specifically indicated to the contrary. Likewise, any subset or combination of these is also specifically contemplated and disclosed. This concept applies to all aspects of this disclosure including, but not limited to, steps in methods using the disclosed systems or devices. Thus, if there are a variety of additional steps that can be performed, it is understood that each of these additional steps can be performed with any specific method steps or combination of method steps of the disclosed methods, and that each such combination or subset of combinations is specifically contemplated and should be considered disclosed.

The invention claimed is:

1. A method of identifying data for producing a user-customized mask for contacting at least a face contacting surface of a face of a user when the user wears the user-customized mask, the method comprising:
    receiving 3D-data defining a contour of at least a portion of a face of the user and defining dimensions of the portion of the face, wherein at least a portion of the 3D-data is determined by analyzing vector data associated with an area around one or both eyes, a nose, a mouth, or cheeks of the user,
    identifying at least one contact area on the portion of the face of the user based on the 3D-data, wherein the face contacting surface is within the at least one contact area, and
    providing structure-data based on the 3D-data and the at least one contact area for designing and producing at least a portion of the user-customized mask, wherein the user-customized mask comprises a mask body and an elongated support coupled to the mask body, wherein the elongated support does not extend around an entire perimeter of the mask body, and wherein the structure-data is used to design the elongated support to match the contour and the dimensions of the portion of the face, and
    wherein the user-customized mask covers only a part of the face of the user below the one or both eyes of the user and on a chin of the user.

2. The method according to claim 1, wherein the method further comprises producing the elongated support using the structure-data and wherein the mask body defines a sleeve, wherein the elongated support is received within the sleeve to couple the elongated support with the mask body.

3. The method according to claim 1, wherein receiving 3D-data further comprises receiving a plurality of 2D-images of the portion of the face of the user, wherein the 2D-images define the dimensions of the portion of the face of the user at least in the area around the one or both eyes, the nose, the mouth, or the cheeks of the user, and producing the 3D-data based on the plurality of 2D-images by analyzing vector data at least in the area around the one or both eyes, the nose, the mouth, or the cheeks of the user.

4. The method of claim 1, further comprising the step of using the user-customized mask in treatment of a respiratory condition.

5. The method of claim 4, wherein the respiratory condition comprises sleep apnea.

6. The method of claim 1, wherein the elongated support extends over the user's nose and along the user's cheeks.

7. A system for producing a user-customized mask, the user-customized mask for contacting at least a face contacting surface of a face of a user when the user wears said mask, the system comprising:
    a processor that (1) receives and analyzes 3D-data defining a contour of at least a portion of the face of the user and defining dimensions of the portion of the face of the user, wherein at least a portion of said 3D-data is determined by analyzing vector data associated with an area around one or both eyes, a nose, a mouth, or cheeks of the user, (2) identifies at least one contact area on the portion of the face of the user based on the 3d-data, and (3) provides structure-data based on the 3d-data and the at least one contact area for designing and producing at least a portion of the user-customized mask, wherein the user-customized mask comprises a mask body and an elongated support coupled to the mask body, wherein the elongated support does not extend around an entire perimeter of the mask body, and wherein the structure-data is used to design the elongated support to match the contour and the dimensions of the portion of the face; and
    a production device that receives the structure-data and produces the elongated support based on the structure-data,
    wherein the user-customized mask covers only a part of the face of the user below the one or both eyes of the user and on a chin of the user.

8. The system according to claim 7, wherein the mask body defines a sleeve, wherein the elongated support is received within the sleeve to couple the elongated support with the mask body, and wherein the elongated support extends over the user's nose and along the user's cheeks.

9. A user-customized mask for contacting at least a face contacting surface of a face of a user when the user wears the mask, wherein a portion of the user-customized mask comprises a mask contacting surface for contacting the face contacting surface of the user, wherein the mask contacting surface matches a contour and dimensions of the face contacting surface, and a contour of the mask contacting surface is determined by analyzing vector data associated with an area around one or both eyes, a nose, a mouth, or cheeks of the user or one or more other users, wherein the user-customized mask comprises a mask body and an elongated support coupled to the mask body, wherein the elongated support does not extend around an entire perimeter of the mask body, and wherein the structure-data is used to design the elongated support to match the contour and the dimensions of the portion of the face, and
wherein the user-customized mask covers only a part of the face of the user below the one or both eyes of the user and on a chin of the user.

10. The user-customized mask according to claim 9, wherein the user-customized mask is a personal protective equipment.

11. The user-customized mask according to claim 9, wherein the elongated support causes the mask body to fit against the face contacting surface.

12. The user-customized mask of claim 11, wherein the elongated support extends over the user's nose and along the user's cheeks.

13. The user-customized mask of claim 9, wherein the mask body defines a sleeve, and the elongated support is received within the sleeve to couple the elongated support with the mask body.

14. The user-customized mask of claim 9, wherein the elongated support is coupled to the mask body by an adhesive.

15. The user-customized mask of claim 9, wherein the elongated support is coupled to the mask body by a hook or a loop material engaged with an other of the loop or the hook material on the mask body.

16. The user-customized mask of claim 9, wherein the user-customized mask is a mask for treatment of a respiratory condition.

17. The user-customized mask of claim 16, wherein the respiratory condition comprises sleep apnea.

18. An elongated support for coupling with a user-customized mask, the user-customized mask for contacting at least a face contacting surface of a face of a user when the user wears the mask, the elongated support comprising:
a first surface, and
a second surface that is opposite and spaced apart from the first surface,
wherein the user-customized mask comprises a mask body and the elongated support coupled to the mask body, wherein the elongated support does not extend around an entire perimeter of the mask body, and wherein the first surface of the elongated support has a contour that matches a contour and dimensions of the face contacting surface of the user, and
wherein the user-customized mask covers only a part of the face of the user below the one or both eyes of the user and on a chin of the user.

19. The elongated support of claim 18, wherein a thickness of the elongated support is constant along a length of the elongated support.

20. The elongated support of claim 18, wherein the contour of the first surface is determined by analyzing vector data associated with an area around one or both eyes, a nose, a mouth, or cheeks of the user.

* * * * *